United States Patent [19]

Ide et al.

[11] Patent Number: 5,217,211
[45] Date of Patent: Jun. 8, 1993

[54] FLUID-FILLED ELASTIC MOUNT HAVING VACUUM-RECEIVING CHAMBER PARTIALLY DEFINED BY FLEXIBLE DIAPHRAGM WITH RIGID RESTRICTION MEMBER

[75] Inventors: Akiyoshi Ide, Inuyama; Atsushi Muramatsu, Komaki, both of Japan

[73] Assignee: Tokai Rubber Industries, Ltd., Japan

[21] Appl. No.: 845,946

[22] Filed: Mar. 4, 1992

[30] Foreign Application Priority Data

Mar. 14, 1991 [JP] Japan .................... 3-22472[U]

[51] Int. Cl.⁵ .................................... F16F 13/00
[52] U.S. Cl. ........................ 267/140.13; 267/219; 248/562; 248/636
[58] Field of Search ........... 267/35, 140.1 R, 140.1 A, 267/140.1 AE, 140.1 E, 219; 248/636, 638, 566, 550, 562

[56] References Cited

U.S. PATENT DOCUMENTS

| | | | |
|---|---|---|---|
| 4,641,817 | 2/1987 | Clark et al. | 267/140.1 A |
| 4,657,232 | 4/1987 | West | 267/140.1 A |
| 4,711,206 | 12/1987 | Andrä et al. | 267/140.1 A |
| 4,828,234 | 6/1989 | Hoying et al. | 267/140.1 AE |
| 4,869,477 | 9/1989 | Hoying et al. | 267/140.1 AE |
| 5,114,124 | 5/1992 | Muramatsu | 267/140.1 A |

FOREIGN PATENT DOCUMENTS 2041488  9/1980  United Kingdom ........ 267/140.1 A

*Primary Examiner*—Robert J. Oberleitner
*Assistant Examiner*—Kevin D. Rutherford
*Attorney, Agent, or Firm*—Parkhurst, Wendel & Rossi

[57] ABSTRACT

A fluid-filled elastic mount including first and second support members and an elastic body interposed between these members for elastic connection thereof. The elastic mount has a pressure-receiving chamber partially defined by the elastic body, first and second equilibrium chambers defined by first and second flexible diaphragms and communicating with the pressure-receiving chamber through first and second orifice passages, respectively. The second orifice passage has a higher ratio of the cross sectional area to the length than the first orifice passage. The present elastic mount further includes a pressure control device for selectively applying a vacuum pressure to a vacuum-receiving chamber which lies behind the second equilibrium chamber via the second diaphragm, to thereby restrict elastic deformation of the second diaphragm. A rigid restriction member is secured to a part of the second diaphragm which is opposed to an opening of an air passage through which the vacuum pressure is applied to the vacuum-receiving chamber.

14 Claims, 3 Drawing Sheets

FLUID-FILLED ELASTIC MOUNT HAVING VACUUM-RECEIVING CHAMBER PARTIALLY DEFINED BY FLEXIBLE DIAPHRAGM WITH RIGID RESTRICTION MEMBER

BACKGROUND OF THE INVENTION

Field of the Invention

The present invention relates in general to a fluid-filled elastic mount for damping or isolating vibrations based on flow of a fluid contained therein. More particularly, the present invention is concerned with such a fluid-filled elastic mount which is capable of exhibiting different vibration damping or isolating characteristics depending upon the type of the vibrations applied thereto, assuring an excellent damping or isolating effect for a wide frequency range of input vibrations.

Discussion of the Related Art

As one type of a vibration damping device such as an engine mount for a motor vehicle, there is known a so-called fluid-filled elastic mount which includes a first and a second support structure that are spaced apart from each other and elastically connected to each other by an elastic body interposed therebetween. The fluid-filled elastic mount has a pressure-receiving chamber and a variable-volume equilibrium chamber which are filled with a suitable non-compressible fluid, and an orifice passage which permits flow of the fluid therethrough between the two fluid chambers. The pressure-receiving chamber is partially defined by the elastic body, and a pressure of the fluid in this chamber changes upon application of vibrations. The equilibrium chamber is partially defined by a flexible diaphragm which is elastically deformable to accommodate a volume change of this chamber. The fluid-filled elastic mount of the above type damps the input vibrations, based on resonance of a mass of the fluid flowing through the orifice passage, more effectively than an elastic mount which relies only upon the elasticity of the elastic body for damping the vibrations.

Generally, the elastic mount is required to exhibit different vibration damping or isolating characteristics depending upon the type of the vibrations applied thereto. For example, the elastic mount when used as a vehicle engine mount is required to exhibit high damping capability with respect to low-frequency large-amplitude vibrations, such as engine shake and bounce, and to provide a sufficiently reduced dynamic spring constant with respect to relatively high-frequency vibrations such as engine idling vibrations.

However the fluid-filled elastic mount constructed as described above can provide a sufficiently high damping effect based on the resonance of the fluid mass in the orifice passage, only with respect to the vibrations whose frequencies are in the neighborhood of the frequency to which the orifice passage is tuned. Therefore, it has been extremely difficult for the known elastic mount to effectively damp or isolate two or more types of vibrations or a wide frequency range of vibrations.

In view of the above problem, the assignee of the present application proposed in the co-pending U.S. patent application No. 718,425 filed Jun. 20, 1991 a fluid-filled elastic mount which has first and second variable-volume equilibrium chambers partially defined by first and second flexible diaphragms, respectively, and a pressure-receiving chamber formed separately from these two equilibrium chambers. This elastic mount further has a first orifice passage which communicates with the pressure-receiving chamber and first equilibrium chamber, and a second orifice passage which communicates with the pressure-receiving chamber and second equilibrium chamber. The ratio of the cross sectional area to the length of the second orifice passage is set to be higher than that of the first orifice passage. Further, the elastic mount is formed with an air-tight vacuum-receiving chamber which is separated by the second flexible diaphragm from the second equilibrium chamber. In this arrangement, the elastic deformation of the second diaphragm can be controlled by selectively applying a vacuum pressure to the vacuum-receiving chamber, to thereby change the vibration damping or isolating characteristics of the elastic mount.

Namely, while a vacuum pressure is not applied to the vacuum-receiving chamber of the thus constructed elastic mount, the fluid in the mount is forced to flow only through the second orifice passage having the higher ratio of the cross sectional area to the length, so that the elastic mount effectively isolates input vibrations based on flow of the fluid through the second orifice passage. When a vacuum pressure is applied to the vacuum-receiving chamber, on the other hand, the second diaphragm is drawn onto an inner wall of the vacuum-receiving chamber, and is prevented from being freely deformed to accommodate volume changes of the second equilibrium chamber. In this state, the fluid flow through the second orifice passage is discouraged, and the fluid in the mount is forced to effectively flow through the first orifice passage, whereby the elastic mount provides a high vibration damping effect based on the fluid flow through the first orifice passage.

Further study on the thus constructed fluid-filled elastic mount by the present inventors revealed that there is still some room for improvement in terms of the vibration damping/isolating capability and durability of the mount.

More specifically, when the vacuum-receiving chamber is subjected to the vacuum pressure with the second diaphragm drawn onto the inner wall of the vacuum-receiving chamber, so that the input vibrations are damped by the fluid flow through the first orifice passage, the pressure of the fluid in the second equilibrium chamber changes in substantially the same phase with that in the pressure-receiving chamber. Where the elastic mount receives vibrations of a considerably large amplitude, which largely increase the pressure in the second equilibrium chamber, a part of the second flexible diaphragm is likely to intrude into an open end portion of an air passage through which the vacuum pressure is applied to the vacuum-receiving chamber, whereby the volume of the second equilibrium chamber is substantially increased. As a result, a pressure change in the pressure-receiving chamber is absorbed by the volume increase of the second equilibrium chamber, and the amount of the fluid flowing through the first orifice passage is accordingly reduced. Thus, in the elastic mount as described above, there is a possibility of deterioration of its vibration damping effect based on the fluid flow through the first orifice passage.

In addition, the above-described intrusion of the second flexible diaphragm into the open end portion of the air passage may result in reduction in the strength of the diaphragm due to its local deformation, or may cause damage to the diaphragm due to its interference with an edge defining the opening of the air passage, for example. Accordingly, the second diaphragm and the elastic mount as a whole suffer from undesirably lowered durability.

SUMMARY OF THE INVENTION

It is therefore an object of the present invention to provide an improvement over the fluid-filled elastic mount constructed as described above, which provides a significantly improved vibration damping effect due to flow of the fluid through the first orifice passage, and wherein the second flexible diaphragm has a sufficiently high degree of durability.

The above object may be achieved according to the principle of the present invention, which provides a fluid-filled elastic mount for flexibly connecting two members, comprising: (a) a first support member and a second support member which are respectively fixed to the two members to be flexibly connected, and which are spaced apart from each other in a load-receiving direction in which vibrations are applied to the elastic mount; (b) an elastic body interposed between the first and second support members for elastically connecting the first and second support members; (c) the elastic body at least partially defining a pressure-receiving chamber which is filled with a non-compressible fluid, a pressure of the fluid in the pressure-receiving chamber changing due to elastic deformation of the elastic body upon application of the vibrations in the load-receiving direction; (d) a first flexible diaphragm partially defining a first equilibrium chamber filled with the non-compressible fluid, the first flexible diaphragm being elastically deformable so as to permit a volume change of the first equilibrium chamber to absorb a pressure change of the fluid in the first equilibrium chamber; (e) means for defining a first orifice passage which communicates with the pressure-receiving chamber and the first equilibrium chamber so as to permit flow of the fluid therebetween; (f) a second flexible diaphragm partially defining a second equilibrium chamber filled with the non-compressible fluid, the second flexible diaphragm being elastically deformable so as to permit a volume change of the second equilibrium chamber to absorb a pressure change of the fluid in the second equilibrium chamber; (g) means for defining a second orifice passage which communicates with the pressure-receiving chamber and the second equilibrium chamber so as to permit flow of the fluid therebetween, the second orifice passage having a ratio of a cross sectional area thereof to a length thereof, which ratio is higher than that of the first orifice passage; (h) a member cooperating with the second flexible diaphragm to define therebetween a vacuum-receiving chamber separated from the second equilibrium chamber by the second flexible diaphragm, for permitting elastic deformation of the second flexible diaphragm, the member having an air passage communicating with the vacuum-receiving chamber, the air passage having at one of opposite ends thereof an opening which is open to the vacuum-receiving chamber; (i) pressure control means connected to the air passage for selectively applying a vacuum pressure to the vacuum-receiving chamber through the air passage, to thereby restrict the elastic deformation of the second flexible diaphragm; and (j) a rigid restriction member secured to a part of the second flexible diaphragm which is opposed to the opening of the air passage in the load-receiving direction, for preventing deformation of the part of the second flexible diaphragm when the vacuum pressure is applied to the vacuum-receiving chamber.

The fluid-filled elastic mount constructed as described above exhibits different vibration damping or isolating characteristics depending upon the type of the input vibrations, by selectively applying a vacuum pressure to the vacuum-receiving chamber. Thus, the elastic mount is able to effectively damp low-frequency vibrations, based on flow of the fluid through the first orifice passage, and effectively isolate high-frequency vibrations, based on flow of the fluid through the second orifice passage.

In the fluid-filled elastic mount according to the present invention, the rigid restriction member is adapted to prevent the second flexible diaphragm from intruding into an open end portion of the air passage through which the vacuum pressure is applied to the vacuum-receiving chamber. Therefore, the elastic mount is free from problems due to the intrusion of the second diaphragm, such as reduction in the pressure of the fluid in the pressure-receiving chamber, or damage caused to the second diaphragm. Thus, the present elastic mount is able to exhibit excellent damping/isolating capability, assuring significantly improved durability.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENTS

Figure 1:
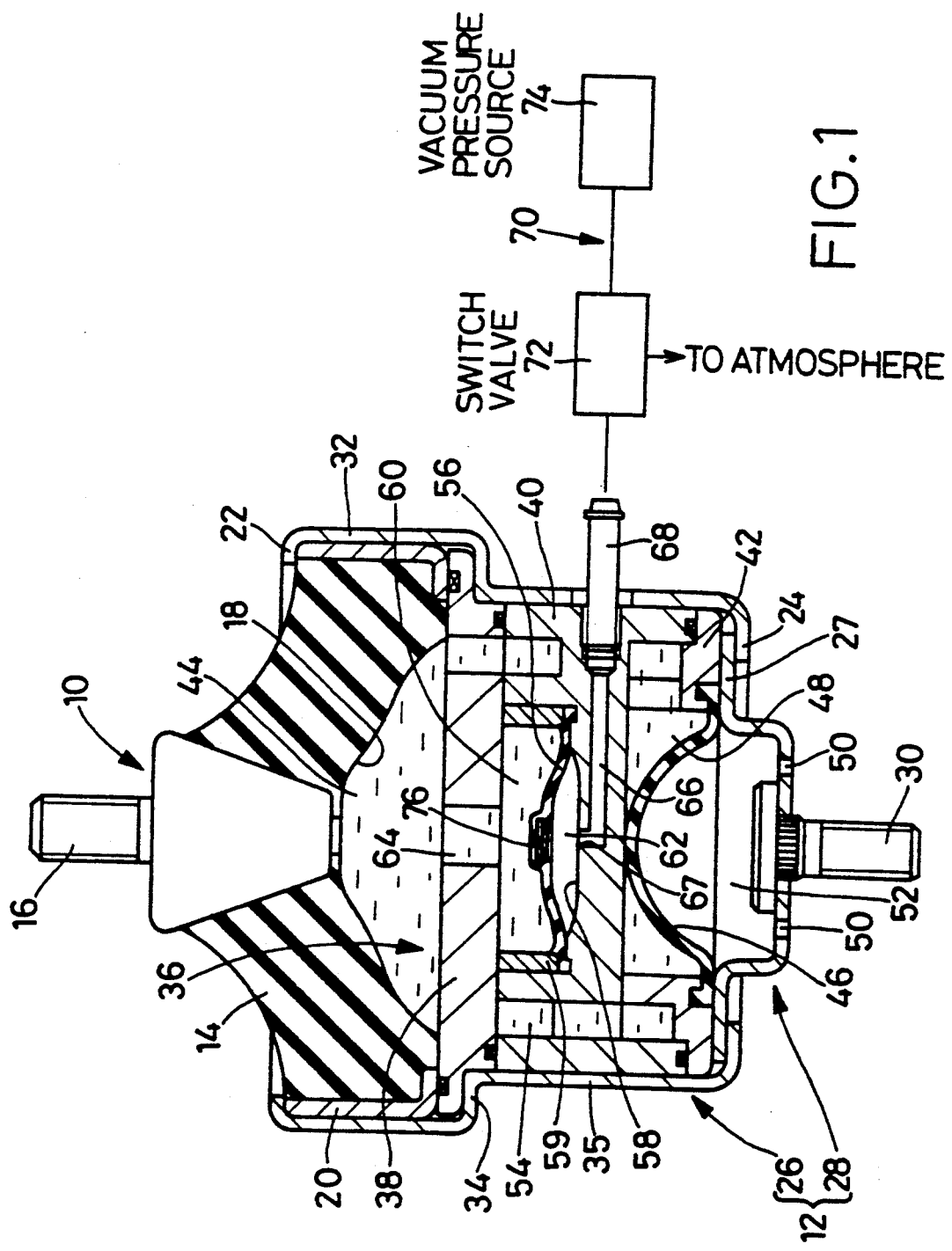
FIG. 1 is an elevational view in axial cross section of one embodiment of a fluid-filled elastic mount of the present invention in the form of an engine mount for a motor vehicle.

Referring first to FIG. 1 showing the vehicle engine mount as one embodiment of the fluid-filled elastic mount of this invention, reference numerals 10 and 12 denote a first and a second rigid support member, respectively. These first and second support members 10, 12 are opposed to each other and spaced apart from each other by a suitable distance, in a load-receiving direction in which vibrations are received by the engine mount. Between the first and second support members 10, 12, there is formed an elastic body 14 such that the two members 10, 12 are elastically connected to each other by the elastic body 14. The instant engine mount is installed on a motor vehicle such that the first support member 10 is fixed to an engine unit including the engine of the vehicle, while the second support member 12 is fixed to the body of the vehicle. Thus, the engine unit is flexibly mounted on the vehicle body in a vibration damping or isolating manner. With the engine mount installed in position on the vehicle as described above, the weight of the engine unit acts on the mount in the direction (vertical direction as viewed in FIG. 1) in which the first and second support members 10, 12 are opposed to each other, whereby the elastic body 14 is elastically deformed or contracted so that the two support members 10, 12 are moved toward each other from their pre-installation positions by a suitable distance in the above-indicated direction. The instant engine mount is adapted to damp or isolate the input vibrations which are applied primarily in the direction in which the first and second support members 10, 12 are opposed to each other, that is, the above-indicated load-receiving direction.

More specifically, the first support member 10 is a metallic member having a generally truncated conical shape. A mounting bolt 16 is formed integrally with the first support member 10 such that the bolt 16 protrudes in the load-receiving direction from a central portion of the large-diameter end face of the support member 10, axially outwardly of the engine mount. The engine mount is fixed to the vehicle engine unit through the mounting bolt 16.

The above-indicated elastic body 14 is secured by vulcanization to the first support member 10. This elastic body 14 has a generally truncated conical shape, and is formed with a cavity 18 which is open in its large-diameter end face on the side of the second support member 12. The first support member 10 is bonded by vulcanization to the small-diameter end face of the elastic body 14, while a cylindrical metallic connecting member 20 is bonded by vulcanization to the outer circumferential surface of a large-diameter end portion of the elastic body 14. Thus, the first support member 10, elastic body 14 and connecting member 20 are formed into an integral unit, by means of vulcanization of a suitable rubber material for the elastic body 14.

The second support member 12 consists of a generally cylindrical member 26 with an axially intermediate shoulder portion 34, and a dish-like bottom member 28 having an outward flange 27 formed at the periphery of the opening thereof. The cylindrical member 26 includes a large-diameter portion 32, a small-diameter portion 35 and the shoulder portion 34 disposed therebetween. The cylindrical member 26 further has an annular projection 24 formed at the open end of the small-diameter portion 35, and a caulked portion 22 formed at the open end of the large-diameter portion 32. The cylindrical member 26 and bottom member 28 are assembled together such that the outward flange 27 of the bottom member 28 is superposed on and supported by the inner surface of the annular projection 24 of the cylindrical member 26. A mounting bolt 30 is formed on the second support member 12 so as to protrude in the load-receiving direction from a central portion of the bottom member 28, axially outwardly of the engine mount. The engine mount is fixed to the vehicle body through the mounting bolt 30.

The above-indicated connecting member 20 secured to the outer surface of the elastic body 14 is fitted in the large-diameter portion 32 of the cylindrical member 26 of the second support member 12, and axially gripped between the shoulder portion 34 and caulked portion 22 of the cylindrical member 26. In this manner, the second support member 12 is assembled with the integral unit of the first support member 10, elastic body 14 and connecting member 20. Thus, the first and second support members 10, 12 are opposed to each other in the load-receiving direction (vertical direction as viewed in FIG. 1) with a suitable spacing therebetween, with the elastic body 14 interposed between these two support members 10, 12 for flexible connection therebetween.

Within the small-diameter portion 35 of the cylindrical member 26 of the second support member 12, there is accommodated a thick-walled, generally circular partition structure 36 which consists of generally disc-like upper and middle partition members 38, 40 and a generally annular lower partition member 42. These three partition members 38, 40, 42 are coaxially superposed on each other in the axial direction of the engine mount, and are fixedly attached to the second support member 12. Between the mating surfaces of the partition members 38, 40 and 42 and between the abutting faces of the upper partition member 38 and the connecting member 20, there are provided suitable 0 rings for ensuring fluid-tightness between these members 38, 40, 42 and 20.

Between the first support member 10 and the upper partition member 38 of the partition structure 36, there is formed a pressure-receiving chamber 44 which is partially defined by the elastic body 14. The pressure-receiving chamber 44 is filled with a suitable non-compressible fluid, such as water, alkylene glycol, polyalkylene glycol and silicone oil. When a vibrational load is applied between the first and second support members 10, 12, a pressure of the fluid in the pressure-receiving chamber 44 changes as a result of a volume change of the same chamber 44 due to elastic deformation of the elastic body 14.

Between the partition structure 36 and the bottom member 28 of the second support member 12, on the other hand, there is formed an enclosed space remote from the pressure-receiving chamber 44. A first flexible diaphragm 46 is accommodated in the enclosed space such that the first diaphragm 46 is fluid-tightly gripped at its perimeter by and between the partition structure 36 (lower partition member 42) and the bottom member 28. The flexible diaphragm 46 is adapted to divide the space between the partition structure 36 and the bottom member 28, into two sections, i.e., a first variable-volume equilibrium chamber 48 and an air chamber 52. The first equilibrium chamber 48, which is formed between the partition structure 36 and the first diaphragm 46, is filled with the non-compressible fluid as described above. This equilibrium chamber 48 will not undergo a pressure change upon application of vibrations to the engine mount, since the pressure change is absorbed by a volume change of the chamber 48 due to elastic deformation or displacement of the first diaphragm 46. The air chamber 52, which is formed between the first diaphragm 46 and the bottom member 28, communicates with the atmosphere through holes 50 formed through the bottom member 28, and is adapted to allow the elastic deformation of the first diaphragm 46.

The partition structure 36 has a first orifice passage 54 formed in the circumferential direction through radially outer portions of the upper, middle and lower partition members 38, 40, 42, over a given circumferential length (which is longer than one round and shorter than two rounds in this embodiment). The pressure-receiving chamber 44 and the first equilibrium chamber 48 are held in fluid communication with each other, through the first orifice passage 54 which permits flow of the fluid therethrough between the two fluid chambers 44, 48.

The middle partition member 40 has a recess 58 whose opening is closed by the upper partition member 38, whereby the partition structure 36 is formed with an internal space which is substantially separated from the pressure-receiving chamber 44 and the first equilibrium chamber 48. Within the space formed in the partition structure 36, there is accommodated a second flexible diaphragm 56 such that its peripheral portion is pressed by a retainer ring 59 against the bottom wall of the recess 58. This second diaphragm 56 divides the space between these partition members 38, 40, into two sections. Namely, between the upper partition member 38 and the second diaphragm 56 is formed a second equilibrium chamber 60 which is filled with the non-compressible fluid as described above. The second equilibrium chamber 60 will not undergo a pressure change upon application of vibrations to the engine mount, since the pressure change is absorbed by a volume change of the chamber 60 due to elastic deformation of the second diaphragm 56. Between the second diaphragm 56 and the middle partition member 40, there is formed an air-tight vacuum-receiving chamber 62 which allows the elastic deformation of the second diaphragm 56.

The upper partition member 38 has a second orifice passage 64 formed at its central portion through the entire thickness thereof in the axial direction of the mount. The second equilibrium chamber 60 communicates with the pressure-receiving chamber 44, through the second orifice passage 64 which permits flow of the fluid therethrough between the two chambers 44, 60. As is apparent from FIG. 1, the second orifice passage 64 has a larger cross sectional area and a smaller flow length than the first orifice passage 54. That is, the ratio of the cross sectional area to the length of the second orifice passage 64 is higher than that of the first orifice passage 54. Accordingly, the resonance frequency of the fluid flowing through the second orifice passage 64 is set to be higher than that of the fluid flowing through the first orifice passage 54. In the instant embodiment, in particular, the first orifice passage 54 is tuned so that the engine mount is able to effectively damp relatively low-frequency vibrations, such as engine shake or bounce, based on resonance of a mass of the fluid in the passage 54, while the second orifice passage 64 is tuned so that the engine mount exhibits a sufficiently reduced dynamic spring constant with respect to relatively high-frequency vibrations, such as engine idling vibrations, based on the resonance of a mass of the fluid in the passage 64.

The middle partition member 40 is formed with an air passage 66 which extends in the radial direction of the mount and which is open at its outer end in the outer circumferential surface of the member 40. This air passage 66 has an opening 67 at its inner end which is open to the central portion of the recess 58 of the middle partition member 40, such that the passage 66 communicates with the vacuum-receiving chamber 62. Further, a connector 68 is screwed into an outer end portion of the air passage 66, such that the connector 68 protrudes radially outwardly of the mount through the cylindrical member 26. With the instant elastic mount installed in place on the vehicle, the connector 68 is connected through an air conduit 70 to a switch valve 72, and to a vacuum pressure source 74 for supplying the vacuum-receiving chamber 68 with a vacuum pressure. The switch valve 72 is selectively placed in a first position for exposing the vacuum-receiving chamber 62 to the atmosphere, and a second position for connecting the vacuum-receiving chamber 62 to the vacuum pressure source 78. Thus, a selected one of the atmospheric pressure and the vacuum pressure is applied to the vacuum-receiving chamber 62.

Figure 3:
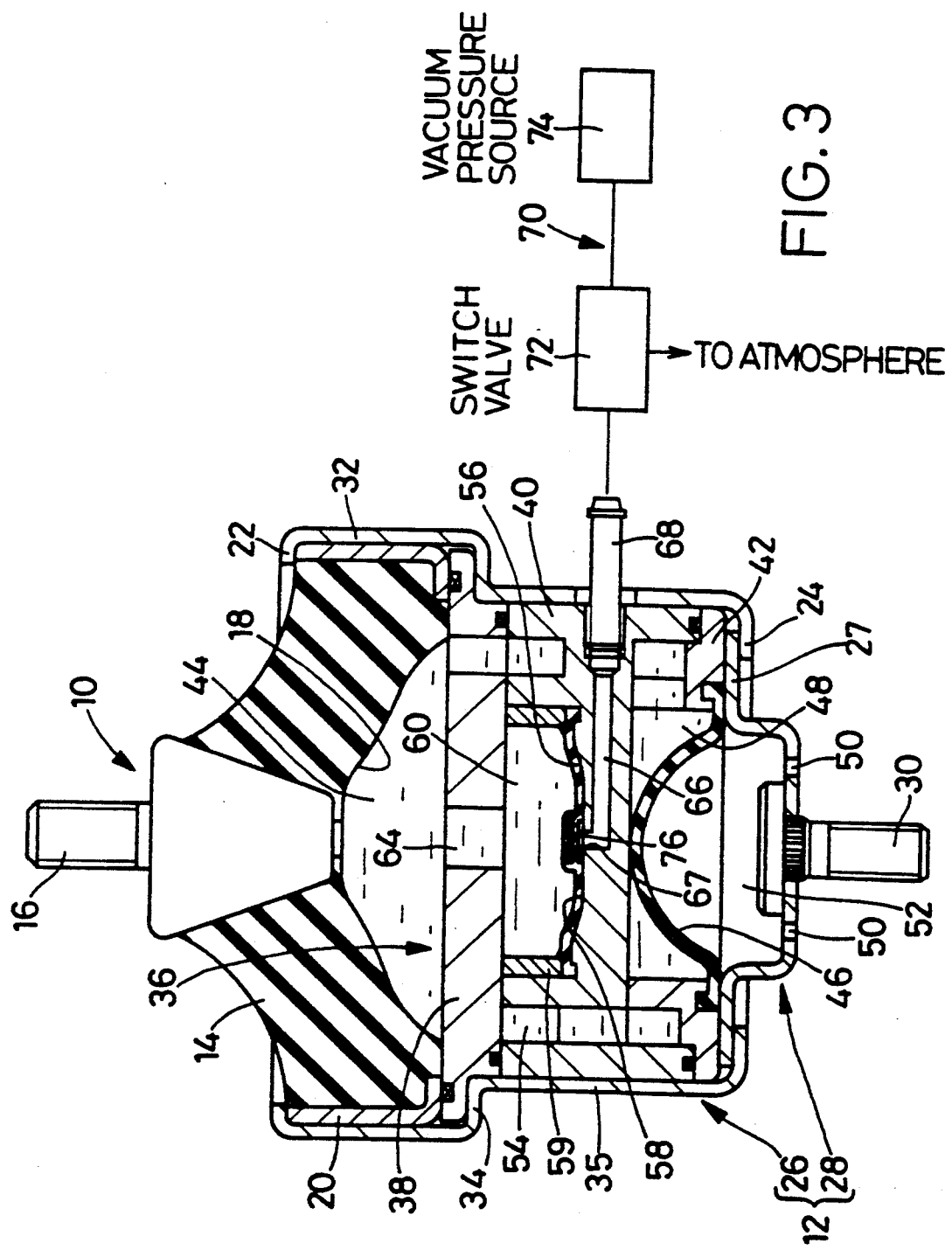
FIG. 3 is an axial cross sectional view of the engine mount of FIG. 1 when a vacuum-receiving chamber of the mount is subjected to a vacuum pressure.

When the vacuum-receiving chamber 62 communicates with the atmosphere through the air passage 66, the vacuum-receiving chamber 62 having a suitable volume is present between the second diaphragm 56 and the bottom wall of the recess 58, as shown in FIG. 1. When the vacuum-receiving chamber 62 is connected to the vacuum pressure source 74, on the other hand, the second diaphragm 56 is drawn onto the bottom wall of the recess 58, whereby the vacuum-receiving chamber 62 is substantially eliminated, that is, the volume of the chamber 62 is substantially zeroed, as shown in FIG. 3.

Figure 2:
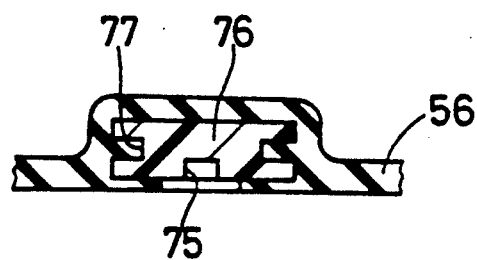
FIG. 2 is a fragmentary enlarged view showing in cross section a second flexible diaphragm with a rigid restriction member of the engine mount of FIG. 1.

To the second diaphragm 56 partitioning the second equilibrium chamber 60 and the vacuum-receiving chamber 62, there is secured a rigid restriction member in the form of a rigid reinforcing disc 76 as illustrated in FIG. 2. The reinforcing disc 76 is located in the central portion of the second diaphragm 56 such that the disc 76 is opposed to the opening 67 of the air passage 66 in the load-receiving direction. The reinforcing disc 76 is formed of a rigid material such as synthetic resin or metal, and has opposite major surfaces whose area is larger than that of the opening 67 of the air passage 66. The reinforcing disc 76 thus secured to the second diaphragm 56 is adapted to prevent or restrict elastic deformation of the central portion of the diaphragm 56.

It is to be understood that the rigid material of the reinforcing disc 76 is not particularly limited. If the disc 76 is made of metal, however, it is desirable to employ a relatively light-weight material such as aluminum, so as not to affect elastic deformation of the second diaphragm 56. In the case of resins, the disc 76 is preferably formed of fiber reinforced resins, such as Nylon 66 which contains glass fibers, so as to assure sufficiently high degrees of heat resistance and strength. The reinforcing disc 76 may be bonded to the second diaphragm 56 by means of vulcanization or by using a suitable adhesive. In the instant embodiment, however, the reinforcing disc 76 is embedded in the second diaphragm 56 such that the diaphragm 56 engages an annular groove 77 formed in the outer circumferential surface of the disc 76. This arrangement does not require any bonding means for firmly securing the reinforcing disc 76 to the second diaphragm 56. Further, the reinforcing disc 76 is covered at its major surface facing the vacuum-receiving chamber 62, with a rubber layer formed as a part of the second diaphragm 56. Accordingly, the disc 76 is prevented from directly contacting the middle partition member 40, thereby avoiding undesirable noise which may be otherwise generated upon abutting contact of the disc 76 with the partition member 40. In FIG. 2, reference numeral 75 denotes a hole formed in the reinforcing disc 76 for positioning the disc 76 when the second diaphragm 56 is molded with the disc 76 embedded therein.

In the thus constructed engine mount as installed in place on the vehicle, upon application of vibrations between the first and second support members 10, 12, the non-compressible fluid is forced to flow between the pressure-receiving chamber 44 and the first and second equilibrium chambers 48, 60, through the first and second orifice passages 54, 64, based on a pressure difference between the pressure-receiving chamber 44 and the two equilibrium chambers 48, 60. In the instant embodiment, the fluid is forced to flow through either the first or second orifice passage 54, 64, by operating the switch valve 72 so that the vacuum-receiving chamber 62 is selectively connected to the vacuum pressure source 74 or exposed to the atmosphere. Thus, the instant engine mount exhibits desired vibration damping or isolating characteristics, depending upon the type of the vibrations applied thereto, based on the resonance of the fluid mass in the first or second orifice passage 54, 64.

More specifically described, the engine mount is required to provide a sufficiently reduced dynamic spring constant for the high-frequency engine idling vibrations which are generated when the vehicle is at a stop with the engine idling. In this case, the switch valve 72 is operated so that the vacuum-receiving chamber 62 is exposed to the atmosphere. As a result, the vacuum-receiving chamber 62 having a given volume lies behind the second diaphragm 62 as shown in FIG. 1, and is adapted to allow the elastic deformation of the second diaphragm 56 to thereby permit volume changes of the second equilibrium chamber 60. Consequently, effective flow of the fluid occurs between the pressure-receiving chamber 44 and the second equilibrium chamber 60 through the second orifice passage 64, based on alternate pressure changes arising in the pressure-receiving chamber 44. Thus, the engine mount exhibits a significantly lowered dynamic spring constant for effectively isolating the engine idling vibrations, based on the resonance of a mass of the fluid in the second orifice passage 64. In this condition, the first orifice passage 54 is also held in fluid communication with the pressure-receiving and first equilibrium chambers 44, 48. However, the fluid is less likely to flow between these chambers 44, 48, due to relatively large resistance to the fluid flow through the first orifice passage 54 as compared with the second orifice passage 64. In substance, the high-frequency engine idling vibrations cause the fluid to effectively flow only through the second orifice passage 64.

While the vehicle is running, the engine mount is required to effectively damp low-frequency large-amplitude vibrations such as engine shake or bounce. In this case, the switch valve 72 is operated so that the vacuum-receiving chamber 62 is connected to the vacuum pressure source 74. As a result, the vacuum-receiving chamber 62 is evacuated and the second diaphragm 56 is drawn onto the bottom wall of the recess 58, as shown in FIG. 3. In this state, the elastic deformation of the second diaphragm 56 is inhibited, and the volume of the second equilibrium chamber 60 is made constant or invariable. Accordingly, the fluid in the mount is forced to flow between the pressure-receiving chamber 44 and the first equilibrium chamber 48 through the first orifice passage 54, due to alternate pressure changes in the pressure-receiving chamber 44. Thus, the engine mount provides an excellent damping effect for the low-frequency vibrations, based on the resonance of the fluid flowing through the first orifice passage 54.

In the engine mount of the instant embodiment, the reinforcing disc 76 is adapted to restrict the deformation of the portion of the second diaphragm 56 which is opposed to the opening 67 of the air passage 66. Therefore, the second diaphragm 56 is almost completely prevented from intruding into an open end portion (adjacent the opening 67) of the passage 66, even if large-amplitude vibrations are applied to the mount to greatly increase the pressure of the fluid in the second equilibrium chamber 60 while the vacuum-receiving chamber 62 is evacuated with the second diaphragm 56 drawn onto the bottom wall of the recess 58. Accordingly, effective flow of the fluid occurs through the first orifice passage 54, based on large pressure changes in the pressure-receiving chamber 44 upon application of large-amplitude vibrations, whereby the engine mount provides a significantly improved vibration damping effect due to the fluid flow through the first orifice passage 54.

Since the reinforcing disc 76 prevents the second diaphragm 56 from intruding into the open end portion of the air passage 66, the second diaphragm 56 does not suffer from reduction in its strength due to local deformation of its central portion, and is free from being damaged due to its interference with an edge of the middle partition member 40 defining the opening 67 of the air passage 66. Thus, the instant elastic mount as well as the second diaphragm 56 assures significantly improved durability.

While the present invention has been described in its presently preferred embodiment with a certain degree of particularity, for illustrative purpose only, it is to be understood that the invention is not limited to the details of the illustrated embodiments, but may be embodied otherwise.

For example, the construction of the rigid restriction member and the manner in which the rigid restriction member is secured to the second flexible diaphragm are by no means limited to those of the illustrated embodiment, but may be suitably modified in view of the required strength of the restriction member, and the level of the pressure arising in the pressure-receiving chamber upon application of vibrations to the mount.

Figure 4:
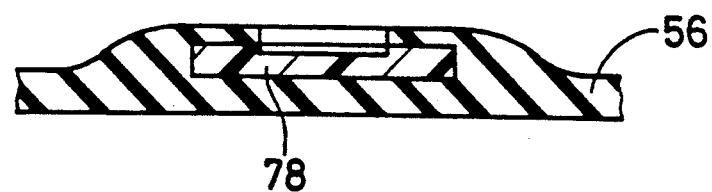
FIG. 4 is a view corresponding to that of FIG. 2, showing another example of rigid restriction member used in the fluid-filled elastic mount of the present invention.

More specifically, where the rigid restriction member is formed of a relatively high-strength material and the input vibrations to be applied to the engine mount do not raise the pressure in the pressure-receiving chamber to a considerably high level, the rigid restriction member may take the form of a relatively thin-walled reinforcing disc 78 as illustrated in FIG. 4, which does not have any part for engagement with the second diaphragm 56. This reinforcing disc 78 is not necessarily embedded in the second diaphragm 56, but may be secured to an outer surface of the diaphragm 56.

Further, the constructions and shapes of the first and second orifice passages are not limited to those of the illustrated embodiment, but may be suitably modified depending upon the required vibration damping or isolating characteristics of the elastic mount.

While the illustrated embodiment of the invention is used as an engine mount for a motor vehicle, the principle of the present invention is equally applicable to any fluid-filled elastic mount other than the engine mount, for example, to a vehicle body mount and a differential gear mount for the vehicle.

It is to be understood that the present invention may be embodied with various other changes, modifications and improvements, which may occur to those skilled in the art, without departing from the scope of the invention defined in the following claims.

What is claimed is:

1. A fluid-filled elastic mount for flexibly connecting two members, comprising:
   a first support member and a second support member which are respectively fixed to the two members to be flexibly connected, and which are spaced apart from each other in a load-receiving direction in which vibrations are applied to the elastic mount;

an elastic body interposed between said first and second support members for elastically connecting the first and second support members;

said elastic body at least partially defining a pressure-receiving chamber which is filled with a non-compressible fluid, a pressure of said fluid in said pressure-receiving chamber changing due to elastic deformation of said elastic body upon application of the vibrations in said load-receiving direction;

a first flexible diaphragm partially defining a first equilibrium chamber filled with said non-compressible fluid, said first flexible diaphragm being elastically deformable so as to permit a volume change of said first equilibrium chamber to absorb a pressure change of said fluid in said first equilibrium chamber;

means for defining a first orifice passage which communicates with said pressure-receiving chamber and said first equilibrium chamber so as to permit flow of said fluid therebetween;

a second flexible diaphragm partially defining a second equilibrium chamber filled with said non-compressible fluid, said second flexible diaphragm being elastically deformable so as to permit a volume change of said second equilibrium chamber to absorb a pressure change of said fluid in said second equilibrium chamber;

means for defining a second orifice passage which communicates with said pressure-receiving chamber and said second equilibrium chamber so as to permit flow of said fluid therebetween, said second orifice passage having a ratio of a cross sectional area thereof to a length thereof, which ratio is higher than that of said first orifice passage;

a member cooperating with said second flexible diaphragm to define therebetween a vacuum-receiving chamber separated from said second equilibrium chamber by said second flexible diaphragm, for permitting elastic deformation of the second flexible diaphragm, said member having an air passage communicating with said vacuum-receiving chamber, said air passage having at one of opposite ends thereof an opening which is open to said vacuum-receiving chamber;

pressure control means connected to said air passage for selectively applying a vacuum pressure to said vacuum-receiving chamber through said air passage, to thereby restrict the elastic deformation of said second flexible diaphragm; and a rigid restriction member secured to a part of said second flexible diaphragm which is opposed to said opening of said air passage in said load-receiving direction.

2. A fluid-filled elastic mount according to claim 1, wherein said rigid restriction member is embedded in said part of said second flexible diaphragm.

3. A fluid-filled elastic mount according to claim 2, wherein said rigid restriction member comprises a disc-like member having an engaging portion which engages said part of said second flexible diaphragm.

4. A fluid-filled elastic mount according to claim 1, wherein said rigid restriction member comprises a thin-walled disc-like member embedded in said part of said second flexible diaphragm.

5. A fluid-filled elastic mount according to claim 1, wherein said rigid restriction member has opposite major surfaces whose area is larger than an area of said opening of said air passage.

6. A fluid-filled elastic mount according to claim 1, wherein said rigid restriction member is made of metal.

7. A fluid-filled elastic mount according to claim 6, wherein said rigid restriction member is made of aluminum.

8. A fluid-filled elastic mount according to claim 1, wherein said rigid restriction member is made of a synthetic resin.

9. A fluid-filled elastic mount according to claim 1, wherein said air passage extends from a central portion of said vacuum-receiving chamber in a radial direction of the mount, said rigid restriction member being secured to a central part of said second flexible diaphragm as said part of said second flexible diaphragm.

10. A fluid-filled elastic mount according to claim 1, wherein said means for defining a first orifice passage and said means for defining a second orifice passage comprise a partition structure supported by said second support member, said pressure-receiving chamber being formed on one of opposite sides of said partition structure on the side of said first support member, said first equilibrium chamber being formed on the other side of said partition structure.

11. A fluid-filled elastic mount according to claim 10, wherein said partition structure includes said member cooperating with said second equilibrium chamber to define therebetween a vacuum-receiving chamber, said second equilibrium chamber and said vacuum-receiving chamber being formed within said partition structure while being separated from each other by said second flexible diaphragm.

12. A fluid-filled elastic mount according to claim 1, wherein said pressure control means comprises switching means which is operable between a first position for exposing said vacuum-receiving chamber to an atmosphere, and a second position for applying said vacuum pressure to said vacuum-receiving chamber, said non-compressible fluid flowing substantially exclusively through said second orifice passage when said switching means is placed in said first position, and through said first orifice passage when said switching means is placed in said second position.

13. A fluid-filled elastic mount according to claim 12, wherein said pressure control means further comprises a vacuum pressure source for supplying said vacuum-receiving chamber with said vacuum pressure when said switching means is placed in said second position.

14. A fluid-filled elastic mount according to claim 13, wherein said pressure control means further comprises an air conduit connected to said air passage, for applying said vacuum pressure from said vacuum pressure source to said vacuum-receiving chamber through said switching means.

* * * * *